United States Patent
Polf et al.

(10) Patent No.: US 7,002,163 B2
(45) Date of Patent: Feb. 21, 2006

(54) OPTICALLY STIMULATED LUMINESCENCE RADIATION DOSIMETRY METHOD TO DETERMINE INTEGRATED DOSES AND DOSE RATES AND A METHOD TO EXTEND THE UPPER LIMIT OF MEASUREABLE ABSORBED RADIATION DOSES DURING IRRADIATION

(75) Inventors: Jerimy C. Polf, Houston, TX (US); Razvan Gaza, Houston, TX (US); Stephen W. S. McKeever, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

(21) Appl. No.: 10/852,309

(22) Filed: May 24, 2004

(65) Prior Publication Data
US 2004/0262538 A1 Dec. 30, 2004

Related U.S. Application Data
(60) Provisional application No. 60/473,662, filed on May 23, 2003.

(51) Int. Cl.
*G01T 1/10* (2006.01)
(52) U.S. Cl. .................. 250/484.5; 250/484.4
(58) Field of Classification Search ........... 250/484.5, 250/484.4, 484.3, 458.1, 459.1, 461.1, 370.07, 250/370.11
See application file for complete search history.

(56) References Cited

U.S. PATENT DOCUMENTS

| | | | |
|---|---|---|---|
| 5,091,653 A * | 2/1992 | Creager et al. | 250/484.5 |
| 5,892,234 A | 4/1999 | McKeever et al. | 250/459.1 |
| 5,962,857 A | 10/1999 | McKeever et al. | 250/484.5 |
| 6,087,666 A * | 7/2000 | Huston et al. | 250/484.5 |
| 6,316,782 B1 | 11/2001 | Akselrod et al. | 250/582 |
| 6,414,324 B1 | 7/2002 | Colyott et al. | 250/484.5 |
| 2004/0159803 A1 * | 8/2004 | Akslrod et al. | 250/581 |

* cited by examiner

*Primary Examiner*—Otilia Gabor
(74) *Attorney, Agent, or Firm*—Fellers, Snider, Blankenship, Bailey & Tippens, P.C.

(57) ABSTRACT

There is provided herein a system and method for obtaining measurements of radiation exposure in real time using OSL and for obtaining improved accurate OSL measurements over a greater range of radiation exposures. In a preferred embodiment a signal-versus-dose response is obtained from an OSL dosimeter that is linear over all doses and does not exhibit saturation effects. The desired response is preferably calculated from the measured OSL-versus-time response from a suitable dosimeter obtained during irradiation. To obtain the desired response from the measured OSL data each measured OSL point has to be corrected for the depletion of the trapped electron concentration that occurs during each illumination period.

18 Claims, 6 Drawing Sheets

OPTICALLY STIMULATED LUMINESCENCE RADIATION DOSIMETRY METHOD TO DETERMINE INTEGRATED DOSES AND DOSE RATES AND A METHOD TO EXTEND THE UPPER LIMIT OF MEASUREABLE ABSORBED RADIATION DOSES DURING IRRADIATION

CROSS REFERENCE TO RELATED APPLICATION

This application claims the benefit of U.S. Provisional Application No. 60/473,662, which application was filed with the Patent and Trademark Office on May 23, 2003, which application is hereby incorporated by reference.

FIELD OF THE INVENTION

This invention relates generally to methods for using Optically Stimulated Luminescence (OSL) in radiation dosimetry and, more specifically, improved methods for using OSL to determine integrated doses and dose rates over wide dose ranges.

BACKGROUND OF THE INVENTION

Luminescence techniques in radiation dosimetry have traditionally been dominated by thermal methods in which a sample (a thermoluminescence dosimeter, or TLD) is exposed of radiation and is then heated in the dark. At a certain temperature, or within a certain temperature range (either of which is dependent upon the material used and the detailed parameters of the heating procedure), luminescence is emitted from the material. The intensity (for example, the integrated light emission between two specified temperatures) is related, by calibration procedures, to the original absorbed dose of radiation. This method of radiation dosimetry has been described in the literature, and has been in general usage, for approximately five decades.

However, in many circumstances OSL has proven to be a superior method of measuring radiation dose. Generally speaking, OSL methods irradiate a dosimeter with light of a particular frequency and intensity. This exposure excites light production within the dosimeter by transfer of charges from traps to luminescent centers. Then, by measuring intensity and duration of the resulting luminescence decay that is emitted from the dosimeter, an accurate measure may be obtained of the amount of radiation to which the dosimeter was exposed.

As useful as OSL has proven to be, its conventional application has certain shortcomings. More particularly, there is a general departure from linearity in the luminescence/dose curve at higher dose levels and it is susceptible to saturation effects. Further, conventional OSL is not suitable for use in real-time measurement of radiation dose such as would be useful in the treatment of medical disorders by radiation.

Methods and dosimeters employing optically stimulated luminescence in the detection of radiation exposures are described in U.S. Pat. Nos. 5,892,234; 5,962,857; 6,316, 782; and 6,414,324, which patents are incorporated herein by reference as if fully set out at this point.

Heretofore, as is well in the radiation dosimetry industry, there has been a need for an invention that provides a method for extending the upper limit of measurable absorbed radiation doses during irradation. Accordingly it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided herein a system and method for obtaining measurements of radiation exposure in real time using OSL over a wide range of radiation exposures without the restriction of saturation effects.

In brief, a principal goal of the instant invention is to obtain a signal-versus-dose response from an Optically Stimulated Luminescence (OSL) dosimeter that is linear over all doses and does not exhibit saturation effects. The desired response is preferably calculated from the measured OSL-versus-time response from a suitable dosimeter obtained during irradiation. To obtain the desired response from the measured OSL data each measured OSL point has to be corrected for the depletion of the trapped electron concentration that occurs during each illumination period.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments

DESCRIPTION OF THE PREFERRED EMBODIMENTS

Referring now to the drawings, wherein like reference numerals indicate the same parts throughout the several views, there is provided a preferred system and method for determining integrated does and does rates and a method to extend the upper limit of measurable absorbed radiation does during irradiation.

Preferred Apparatus

The equipment and method used for measuring the OSL signal during irradiation is preferably as follows. An $Al_2O_3$ single crystal is connected to the end of a fiber optic cable. The crystal is placed inside a radiation field. Preferably, light from a Nd:YAG laser (532 nm) is transmitted down the fiber to stimulate the crystal. Luminescence from the crystal is transmitted back up the fiber and is directed into a photomultiplier tube (PMT). Filters are used to prevent the light from the laser being directly detected by the PMT, which only sees the luminescence from the $Al_2O_3$ crystal.

Figure 1:
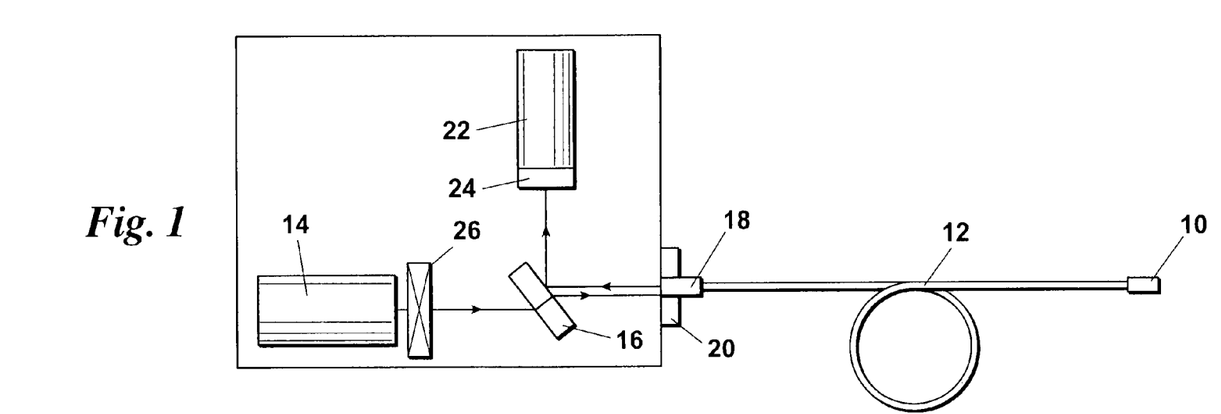
FIG. 1 contains a schematic illustration of a preferred apparatus for use with the instant invention.

FIG. 1 contains a preferred hardware arrangement suitable for use with the instant invention. The dosimeter 10 is preferably attached to the distal end of a fiber optic cable 12 and is placed within the radiation field in preparation for application of the methods disclosed herein. The dosimeter is stimulated during irradiation with light from the light source 14 which is preferably monochromatic light from a laser light source. The illuminating light preferably passes through the beam splitter 16 and is coupled to the fiber cable via coupler 18 and the translation stage 20. Luminescence from the dosimeter is preferably transported back along the same fiber cable and is preferably reflected by the dichroic beamsplitter into the PMT 22 via filters 24. The laser stimulation is preferably timed via operation of optical shutter 26.

Figure 2:
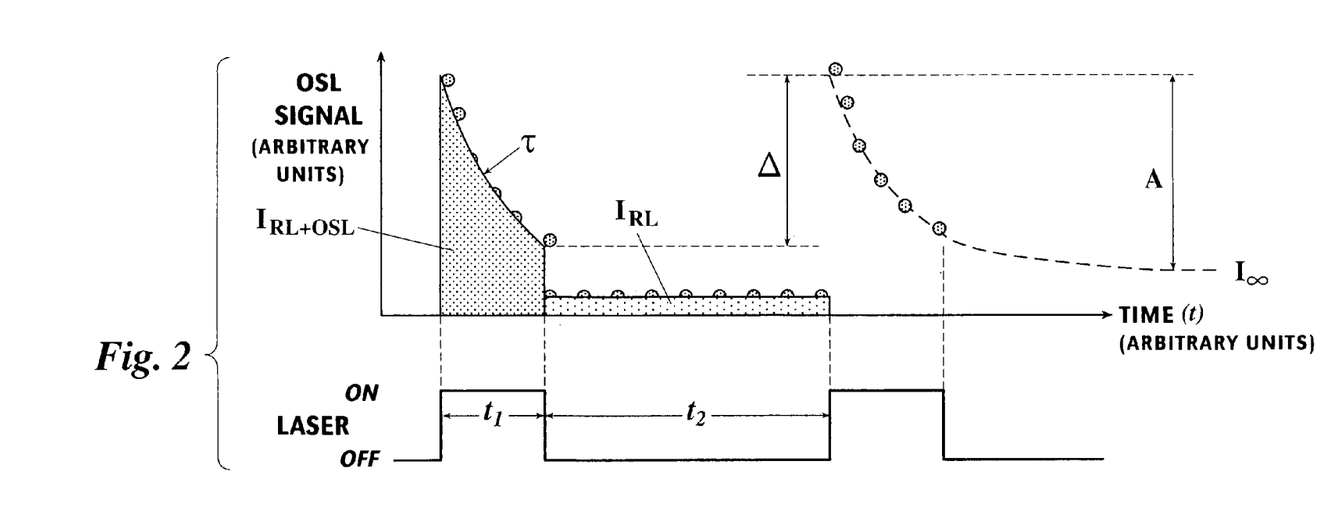
FIG. 2 contains a schematic illustration of the OSL (+RL) signal obtained during periodic stimulations of the sample (of time $t_1$), with each stimulation separated by time $t_2$.
Figure 3:
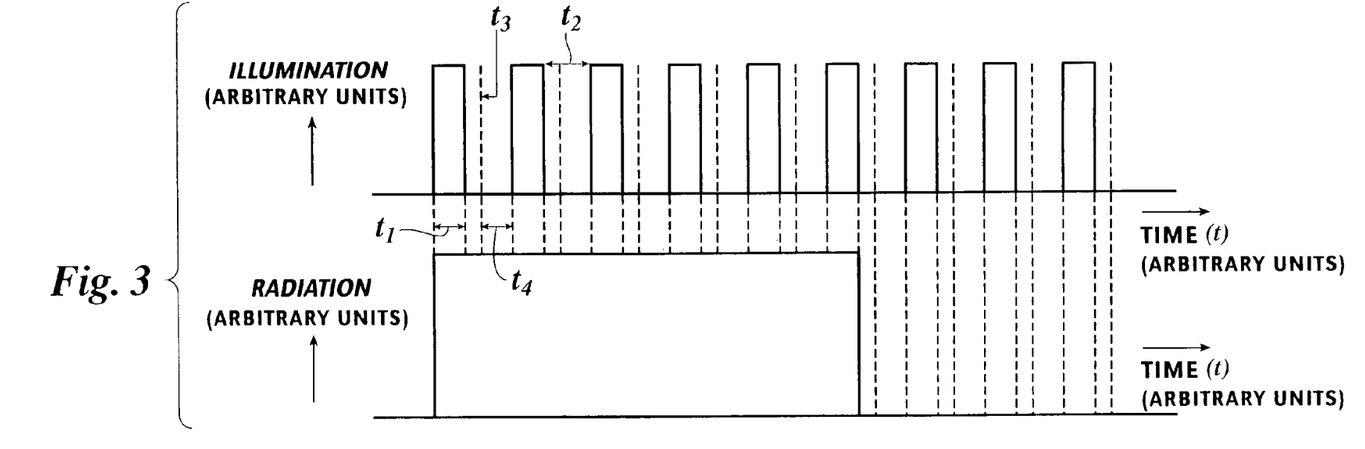
FIG. 3 contains a schematic illustration of a preferred OSL timing sequence.

As is indicated in FIG. 2, the luminescence signal observed during the laser stimulation period is made up of the sum of the OSL signal, plus any signals due to radioluminescnce (RL) and Cerenkov irradiation (CkL). The latter two luminescence signals arise from both the sample and the optical fiber cable. In the periods when no laser stimulation is applied, the luminescence signal is RL+CkL only. Thus, the OSL signal may be isolated by subtraction of the (RL+CkL) during the illumination-off period, from the (OSL+RL+CkL) signal during the illumination-on period. A schematic timing sequence used in the measurements to achieve this is illustrated in FIG. 3. The illumination is modulated with pulses of width $t_1$ (illumination-on period), and with illumination-off periods $t_2$. The illumination-off period consists of a delay period $t_3$ and a measurement period $t_4$. The delay period $t_3$ is necessary to allow for the luminescence induced during the illumination-on period to decay before the background RL and CkL signals are measured. The difference between the photodetector signals measured during periods $t_1$ and $t_4$ (after normalization to account for possibly different values of $t_1$ and $t_4$) gives the desired signal due to OSL. If the modulated illumination continues beyond the end of the irradiation period, a decreasing OSL signal is observed. From such data the percentage OSL decreased during each illumination period can be determined.

Figure 4:
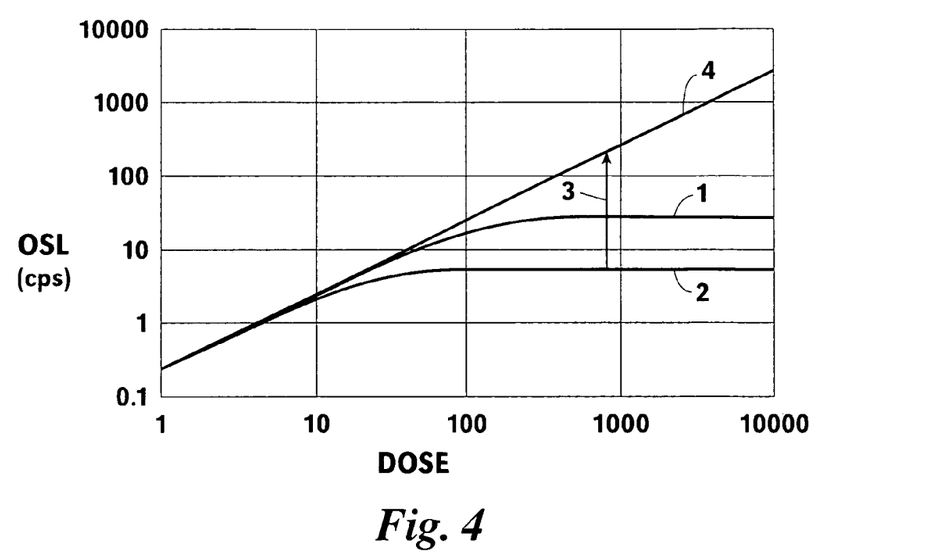
FIG. 4 illustrates some typical OSL signals as a function of type of measurement.

A schematic illustration of the sorts of data that might be obtained in a measurement of this type is shown in FIG. 4. Curve 1 illustrates the growth of the OSL signal from a dosimeter that might be obtained if measured in "integrative" mode, which mode is discussed in greater detail below. The OSL signal is related to the previous dose absorbed by the dosimeter up to the point at which saturation occurs, after which the OSL signal no longer increases with absorbed dose. Curve 2 shows an example of an OSL signal that might be measured during "active" mode. Here, after an initial increase, the OSL signal reaches a constant value, corresponding to the equilibrium level, as described previously. By following the correction procedure described below, curve 2 may be corrected (as illustrated by the vertical arrow, 3) to yield the linear OSL curve (curve 4). Saturation effects, as seen in curve 1, do not limit the growth of the corrected curve with dose.

Discussion of the Theory

Absorption of radiation causes a build up of trapped electrons at electron trapping sites within the $Al_2O_3$ single crystal. If left undisturbed, this trapped electron population will continue to increase until such time as all available electron trapping sites are full, at which point the system is saturated. Since an OSL signal measured after the irradiation will be representative of the trapped electron population, it is found that the OSL signal measured in this way (integrative mode) will likewise increase with dose until saturation is reached at which point no further increase in signal with absorbed dose can be obtained. This effect limits the maximum dose that can be measured with this method.

On the other hand, by illuminating the $Al_2O_3$ single crystal with a periodic train of illumination pulses, a portion of the trapped electron population (up to 100% per pulse) can be released from the electron traps during such illumination. This suggests that, if the $Al_2O_3$ single crystal is continually irradiated during periodic illumination, the trapped electron population will alternately increase (during those periods in which the illumination is off) and decrease (during those periods in which the illumination is on). By adjusting the illumination power, illumination pulse width and laser frequency a psuedo-equilibrium concentration of trapped electrons can be reached for which the number of electrons trapped during one illumination-off period is equal to the net number of electrons released during one illumination-on period. Since the OSL intensity recorded during one illumination-on period is directly proportional to the number of electrons released during that period, then the periodic OSL intensities recorded during this equilibrium phase will be the same for each illumination pulse, and will remain the same for as long as the irradiation and the illumination modulation continue. Thus, the system will never saturate. The intensity of the OSL recorded during this equilibrium phase is governed by the radiation dose rate, the time period between the illumination pulses, the illumination power, and illumination period. For a given dose rate, the equilibrium level can be adjusted by adjusting the illumination pulse width and/or the modulation frequency.

In order to evaluate the total accumulated dose during the whole of the irradiation period under the above circumstances each OSL signal has to be corrected for the depletion of the OSL dose from each of the preceding laser stimulations (i.e., OSL measurements).

Figure 5:
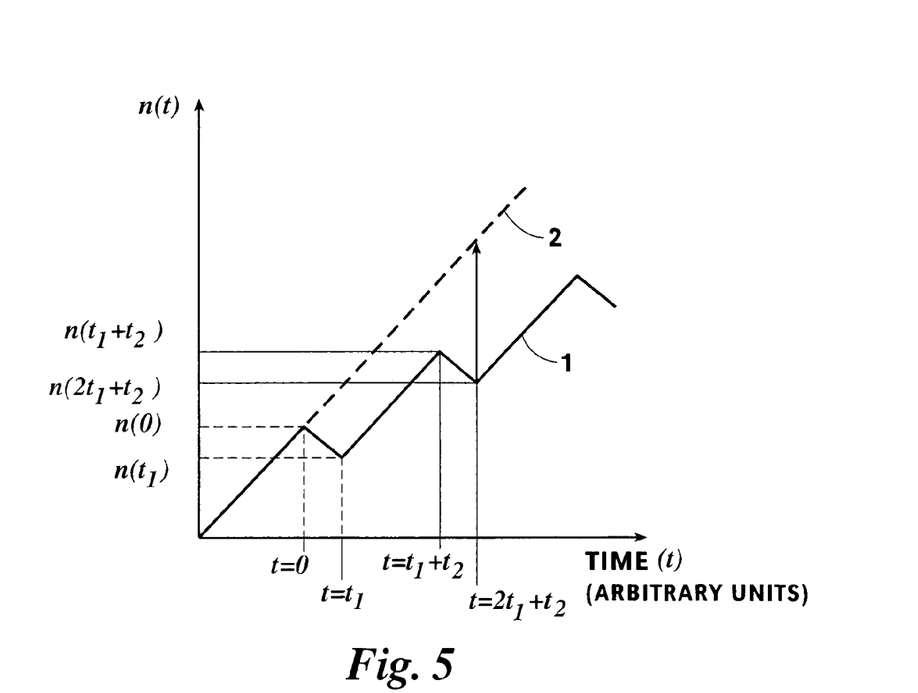
FIG. 5 contains a schematic illustration of the effect of measuring OSL during irradiation.

FIG. 5 schematically illustrates the nature of the problem. During periodic measurement of the OSL, simultaneous with irradiation, the accumulated trapped charge concentration n(t) (curve 1) will increase with absorbed dose linearly until time t=0 at which point the optical stimulation is applied for a period $t_1$. During this period of illumination, the trapped charge concentration changes from n(0) to a new value n($t_1$). The illumination period is followed by a second irradiation-only period of duration $t_2$ after which a second illumination period follows, and so on. The measured OSL intensity is related to r which is itself proportional to the radiation dose rate during that period, the concentration of trapped electrons after the last illumination pulse p, which is proportional to the illumination power, and the illumination period $t_1$. To correct the measured OSL intensity in order to evaluate the OSL intensity that would have been measured at time $t_1+t_2$ if the first illumination period had not occurred (i.e. curve 2), it is noted that the variation in the trapped charge concentration with time t during this process can be written as:

$$n(t)=n(0)e^{-(p+r)t}+Nrt,$$

where N is total concentration of available electron traps, and r is proportional to the irradiation dose rate. The OSL intensity at time t is then given by the expression:

$$I(t) \propto n(t)\frac{p[1-e^{-(p+r)t}]}{p+r}.$$

For purposes of explanation, the difference between the actual OSL intensity at $t_1+t_2$, and the OSL intensity that would have been obtained if there had been no illumination of the sample at t=0 is defined to be $\Delta I$. Then, by solving the above equation at time t=0, and at time $t_1+t_2$, a correction factor $F_D=\Delta I/I(0)$ is found to be given by $$F_D=e^{-rt_1}-e^{-(p+r)t_1}.$$

As is expected, $F_D$ depends only on the irradiation dose rate r, the illumination intensity p, and the illumination time $t_1$. It should be noted that for small irradiation times, such that $rt_1$ and $(p+r)t_1$ are small, $F_D$ can be approximated by $F_D \approx pt_1$, and $F_D$ is independent of dose rate in these circumstances.

The corrected OSL intensity $I^c$ at time $t_1+t_2$ (i.e. $I^c(t_1+t_2)$) can then be obtained from the OSL actually measured at $t_1+t_2$ (i.e. $I(t_1+t_2)$) and the OSL measured at time t=0 (i.e. I(0)) using the relation:

$$I^c(t_1+t_2)=I(t_1+t_2)+F_D*I(0)$$

The numerical value of the correction factor $F_D$ may be determined in several ways. According to a first preferred embodiment ("Option (1)" hereinafter), the dosimeter is irradiated to the time $t=t_1+t_2$ and the OSL measured during an illumination of length $t_1$, while continuing the irradiation. This measurement will be labeled as $I(t_1+t_2)$. The dosimeter is then zeroed (i.e., bleached with light for a sufficient period to reduce the OSL signal to levels comparable with the background signal obtained before irradiation). After zeroing, the experiment is repeated, except that a first OSL measurement is now performed at time $t=t_0$ (i.e., $I(t_0)$) and a second OSL measurement is again taken at time $t=t_1+t_2$ (i.e. $I(t_1+t_2)$). By comparing the two OSL intensities obtained at $t=t_1+t_2$, one may obtain the estimate of $F_D$ from:

$$F_D=\Delta I/I(t_0)=[I(t_1+t_2)-I(t_1+t_2)]/I(t_0)$$

Note that in the preferred arrangement, $F_D$ is estimated once for each dosimeter, although it is certainly possible that in some circumstances a single $F_D$ might be developed that would serve for, say, all dosimeters of the same type. Once the depletion value is determined, the OSL may be numerically corrected via the formula:

$$\Delta_j = I_j F_D$$

and, in general, $$I_j^c = I_j + \sum_{i=0}^{j-1} \Delta_i$$

where $I_j$ is signal obtained during the $j^{th}$ OSL measurement, $I_j^c$ is the $j^{th}$ OSL signal corrected for all the previous j-1 OSL measurements, and $\Delta_j$ is the depletion of the OSL that occurs during the $j^{th}$ measurement. It should be noted that $I_j^c$ is proportional to the total accumulated dose absorbed to that point.

Figure 6:
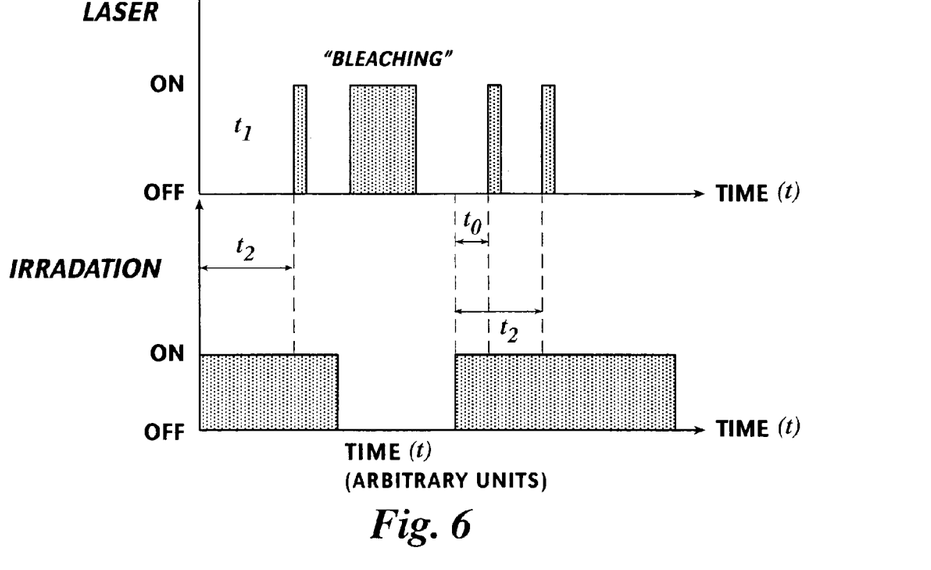
FIG. 6 illustrates a preferred illumination timing for use in determining $F_D$.

By way of summary and as is illustrated in FIG. 6, the following steps would be suitable for use one preferred embodiment of the method of calculating $F_D$:
1. Irradiate a sample;
2. Illuminate at time $t_2$, for period $t_1$; measure OSL during period $t_1$, and call this measurement $I(t_1+t_2)$.;
3. Bleach the sample to zero;
4. Irradiate again;
5. Illuminate at time $t_0$ for interval $t_1$; measure OSL during $t_1$, and call this measurement $I(t_0)$;
6. Continue to irradiate;
7. Illuminate again at time $t_2$ for time $t_1$; call this OSL signal $I(t_1+t_2)$; and,
9. Calculate $F_D$ via the equation $$F_D=\Delta I/I(t_0)=[I(t_1+t_2)-I(t_1+t_2)]/I(t_0).$$

Figure 7:
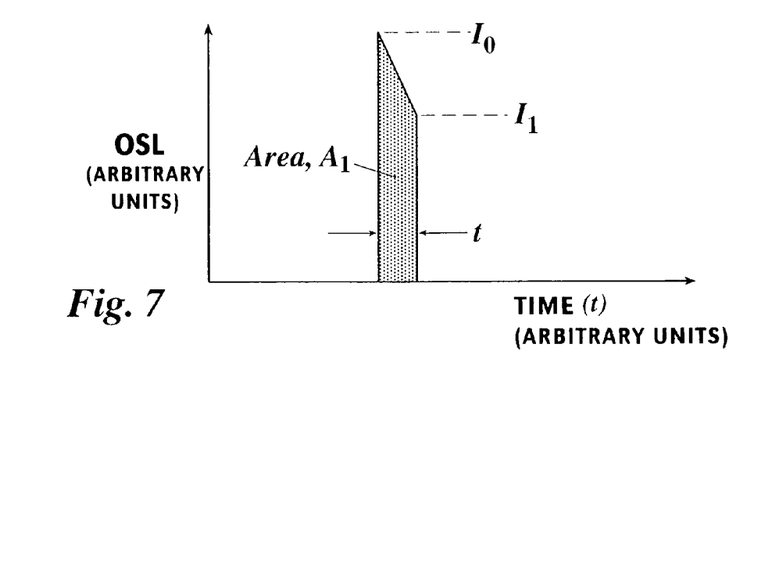
FIG. 7 contains detailed view of a single laser stimulation during irradiation.

Although the assumptions that are inherent in previous method are at least approximately valid for some combinations of sample, dose history, and dose rate, for other combinations this is not the case, and $F_D$ may potentially be different for each OSL measurement. Specifically, for some samples $F_D$ is found to be a function of dose, dose history, dose rate and laser power, to greater or lesser extents. The result is that $F_D$ may not be a constant (i.e. $F_{D1} \neq F_{D2} \neq \ldots F_{Dj-1} \neq F_{Dj}$). Accordingly, in another preferred embodiment ("Option (2)", hereinafter) there is provided a method of real-time dose rate estimation using OSL that accounts for this phenomenon by determining $F_D$ dynamically (e.g., "on the fly") for each laser pulse. Turning to FIG. 7, during a short stimulation pulse, of duration t, the initial and final OSL intensities ($I_0$ and $I_1$, respectively), are determined. The challenge then becomes how to use $I_0$ and $I_1$ to determine the OSL from the next laser pulse in the sequence that would have been obtained if no further irradiation took place and a second laser stimulation pulse had been applied.

Thus, according to the instant embodiment, if $A_1$ is the (measured) integrated area for the first OSL and $A_2$ is the (unknown) signal that would have been obtained if no further irradiation had occurred, then it follows that $F_D=$ $(A_1-A_2)/A_1$. As a consequence, the instant embodiment preferably evaluates $A_2$ from the relation:

$$\frac{A_1}{A_2} = a\frac{I_o}{I_1} + b,$$

where a and b are constants. The constants a and b are preferably determined experimentally for each sample. Those of ordinary skill in the art will recognize that the previously linear functional form is one of any number that could be used to determine numerically fit these quantities. For example, functional forms such as higher order polynomials, exponential functions, trigonometric functions, any combination of the foregoing, etc., could all be potentially be used to provide an estimate of $(A_1/A_2)$ as a function of $(I_0/I_1)$. In practice, constants a and b are preferably determined by making adjacent measurements of $A_1$ and $A_2$ with zero time interval between them (i.e., the time separation is so small that effectively no irradiation is takes place between the two measurements). Then, given a multiplicity of such measurements, the constants a and b can be determined, preferably via linear regression according to the previous equation.

By way of summary, the constants a and b will preferably be determined as discussed previously. Then, the preferred steps of the instant method will proceed as follows.

1. Irradiate the sample;
2. Illuminate the sample during irradiation for interval t;
3. Measure OSL, determine $I_0$, $I_1$ & $A_1$ (as defined in FIG. 7);
4. From known values of a and b, and the equation given above, determine $A_2$;
5. Continue to irradiate for some interval T;
6. Illuminate the sample again for the same interval t;
7. Measure new $I_0$, $I_1$ & $A_1$ again—call these quantities $I'_0$, $I'_1$ and $A'_1$;
8. Determine $(A'_1-A_2)$ which is proportional to the dose D (constant of proportionality obtained by calibration);
9. Determine dose rate from D/T; and,
10. Repeat (from step 4 onwards) for every new pulse, etc.

Broadly speaking, the previous method is designed to use a currently measured OSL signal to provide a numerical estimate of the value of a future OSL signal assuming that no further irradiation of the sample takes place in the intervening time interval. Then, given this estimate, the difference between the actually observed next OSL signal and its predicted value will represent the dose received by the sample in the interim. Of course, those of ordinary skill in the art will recognize that whether this computation actually takes place as an actual "prediction" or whether the correcting calculation is performed after both of the OSL signals have been collected is immaterial to the operation of the instant invention.

Additionally, those of ordinary skill in the art will recognize that the instant method accounts for the fact that the amount of depletion may vary with each pulse, so the actual depletion for every pulse is separately determined. By way of comparison, the constant $F_D$ method, however, assumes the same value of $F_D$ for all pulses and therefore the simple calculation indicated in the text may be used to account for depletions due to all previous laser pulses.

ILLUSTRATIVE EXAMPLES

Figure 8:
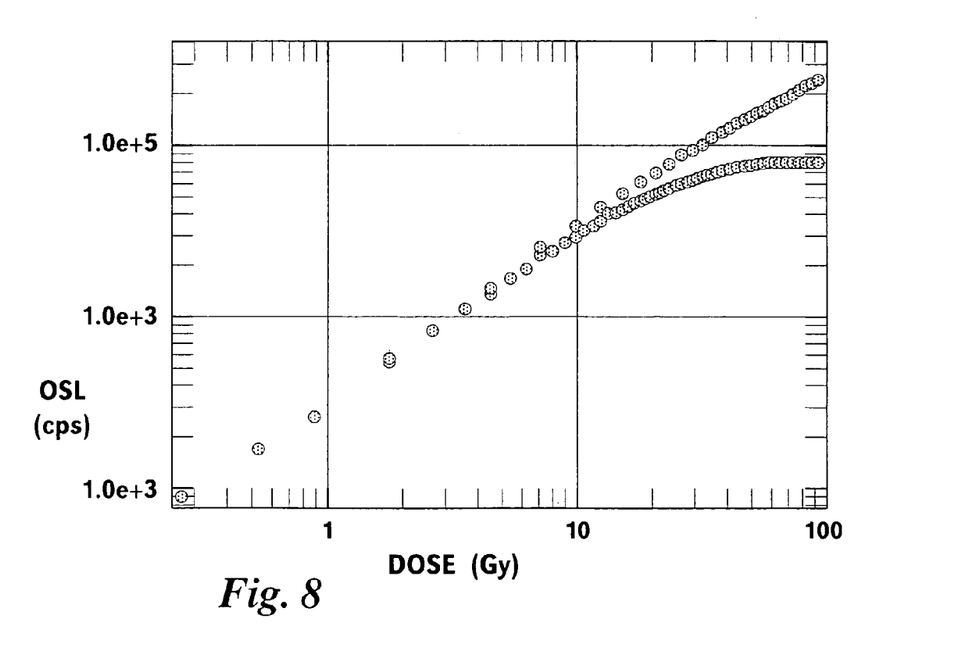
FIG. 8 contains OSL data both with and without correction for the laser pulses used to obtain the data.

FIG. 8 illustrates example data obtained using an $Al_2O_3$ crystal attached to a fiber optic cable and inserted into a $^{90}Sr/^{90}Y$ radiation field at a single constant dose rate. The OSL signal is stimulated periodically during irradiation by passing 532 nm light from a Nd:YAG laser down the fiber optic guide and monitoring the OSL returned back along the fiber using a photomultiplier tube, with appropriate filters in place to separate the stimulation light from the OSL light. The real-time OSL signal is shown in curve 1, and is uncorrected for the previous laser stimulation pulses used to obtain the data. Curve 2 shows the corrected luminescence, corrected using the procedure described in Option (1). For this sample, and under the experimental conditions used, the simple procedure described in Option (1) is sufficient to correct the data and to obtain an approximately linearly increasing signal as a function of irradiation time (which, in turn, is proportional to the total accumulated absorbed dose for the constant dose rate used in these measurements).

Figure 9:
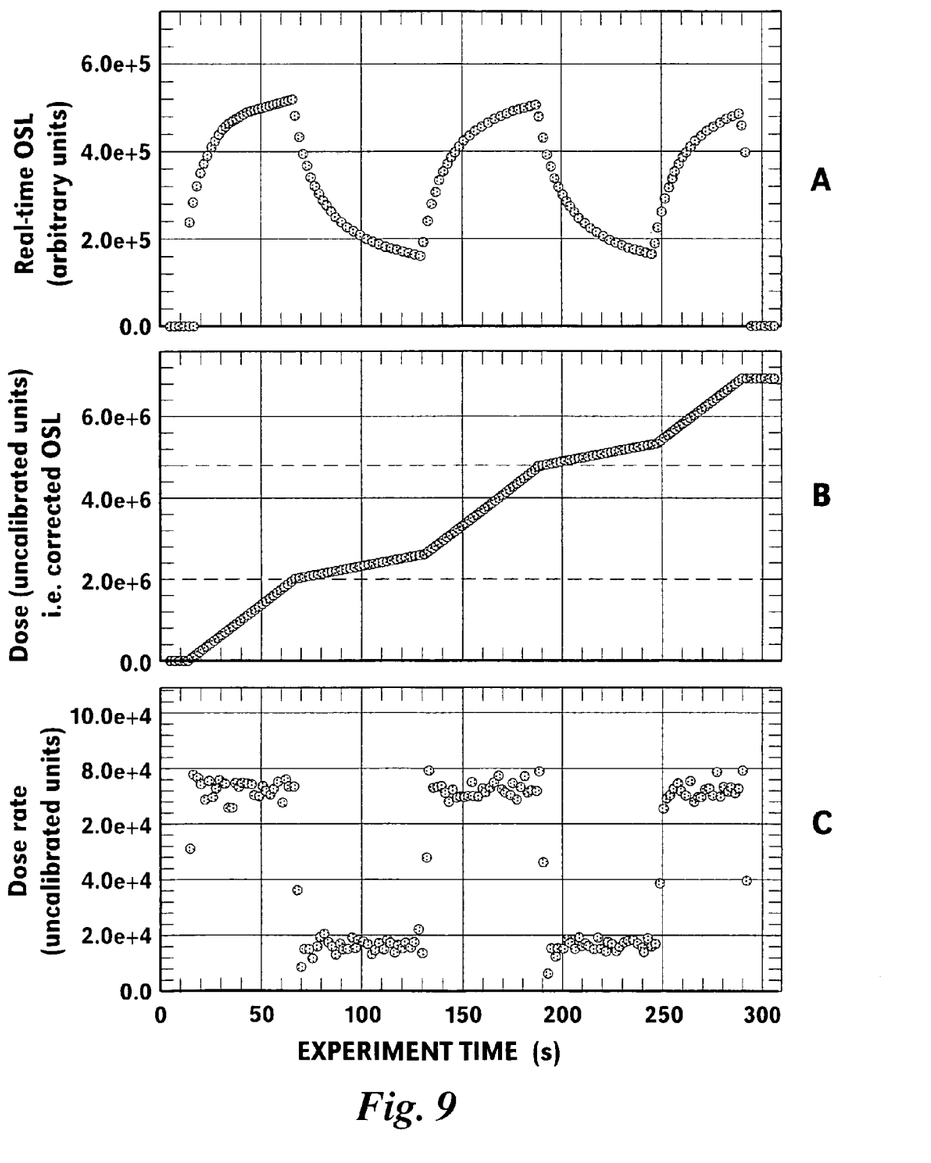
FIG. 9 contains data curves that illustrate an OSL response, the corresponding dose estimate (corrected OSL), and an estimated dose rate.

A second illustrative example is shown in FIG. 9. Here the dynamic procedure described above in Option (2) is used and the dose rate is not fixed, but instead oscillates between two values (55.4 mGy/s and 177 mGy/s). Curve (A) shows the actual real-time OSL data (after subtraction of the RL and CkL signals in the method described) as a function of irradiation time. Curve (B) shows the corrected OSL data (proportional to accumulated dose). Curve (C) shows the dose rate variation with time, demonstrating the oscillation between the two different dose rate values. The sample is again $Al_2O_3$ and the radiation source is a $^{90}Sr/^{90}Y$ beta radiation source.

Figure 10:
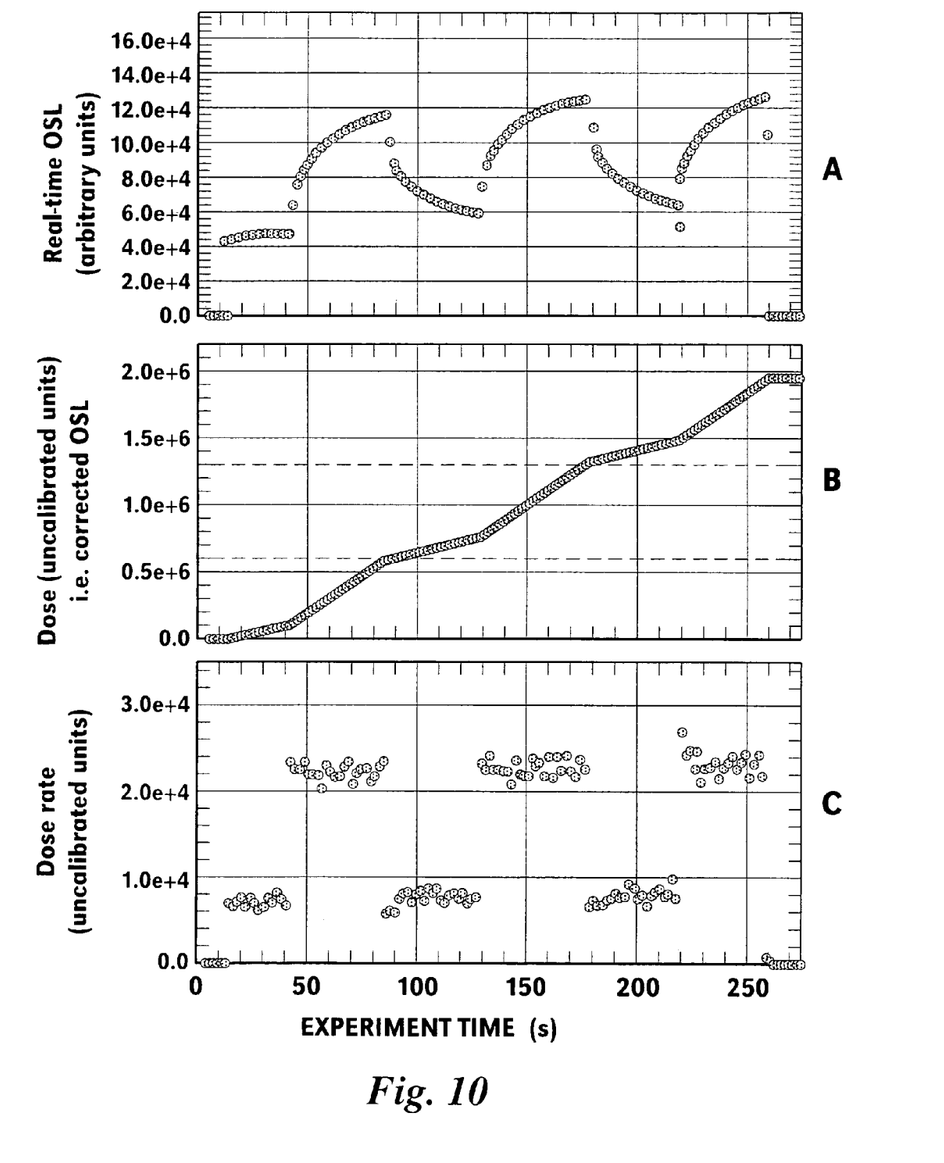
FIG. 10 contains another data example that illustrates an OSL response, the corresponding dose estimate (corrected OSL), and an estimated dose rate.

A third illustrative example is shown in FIG. 10. Here, the dynamic procedure of Option (2) is used again, but the material is $RbMgF_3$ containing $Eu^{2+}$ ions. As with the previous example the dose rate oscillates between 2 values (55.4 mGy/s and 177.0 mGy/s from a $^{90}Sr/^{90}Y$ source). Curve (A) shows the actual real-time OSL data (after subtraction of the RL and CkL signals in the method described) as a function of irradiation time. Curve (B) shows the corrected OSL signal (corrected using Option (2)) and curve (C) shows the extracted dose rate information as a function of irradiation time.

Note that in each of the above examples the corrected OSL signal is uninhibited by saturation effects, provided that the balance between trap filling due to the radiation and trap emptying due to the laser stimulation is such that the steady-state OSL level is below the true saturation level of the sample. Those of ordinary skill in the art will recognize that the particular OSL steady-state level that is used in a particular case will likely need to be determined empirically.

CONCLUSIONS

Although the instant disclosure has been focused for the most part on the use of OSL to estimate dose rate, those of ordinary skill in the art will recognize that the same techniques could be used to estimate the cumulate radiation dose. Thus, in the claims that follow, the term "radiation parameter" will be used in its broadest sense to refer to radiation dose, rate of irradiation, instantaneous dose rate, or, more generally, any measure of the energy of the radiation that is deposited on the dosimeter.

Additionally, it should be understood that the instant method is particularly suited for use where the radiation dose rate is changing in time. As a consequence, when a radiation parameter is estimated, it should be understood that this could be a time-varying quantity and that successive re-measurement or redetermination of such parameter may yield different values due to changes in the underlying radiation source intensity.

Note that the parameters $F_D$, a, and b discussed previously, should be understood to be specific examples of "luminescence correction factors", the purpose of which are to correct observed luminescence values to reflect depletion to the dosimeter caused by earlier illuminations. As a consequence, when the phrase luminescence correction factor is used herein, that phrase should be broadly construed to include any single constant or collection of constants that are used to make this sort of correction.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those skilled in the art, without departing from the spirit of the inventive concept the scope of which is to be determined by the following claims.

What is claimed is:

1. A method of determining a radiation dose parameter via OSL, comprising the steps of:
   (a) selecting a sample;
   (b) determining a luminescence correction factor for said sample;
   (c) irradiating said sample;
   (d) simultaneously with said irradiation, illuminating said sample for a period of time with light containing at least one predetermined light frequency;
   (e) measuring a luminescence signal from said sample;
   (f) correcting a value representative of said luminescence signal using at least said luminescence correction factor, thereby producing a corrected signal value; and,
   (g) estimating said radiation parameter from said corrected signal value.

2. A method of determining a radiation dose parameter via OSL according to claim 1, wherein step (e) comprises the step:
   (e1) measuring a luminescence signal from said sample during said period of time said sample is illuminated.

3. A method of determining a radiation dose parameter according to claim 1, wherein step (b) comprises the step of:
   (b1) irradiating said sample;
   (b2) simultaneously with said irradiation, illuminating said sample for a first period of time with light containing at least one predetermined frequency,
   (b3) measuring at least one luminescence signal from said sample, thereby obtaining at least one pre-bleaching luminescence value,
   (b4) bleaching said sample,
   (b5) continuing to irradiate said sample,
   (b6) simultaneously with said continued irradiation, illuminating said sample with said light for a second period of time,
   (b7) measuring a plurality of time-separated luminescence emissions from said sample, thereby obtaining a plurality of post-bleaching luminescence values,
   (b8) using at least one initial luminescence value and said plurality of post-bleaching luminescence values to determine a luminescence correction factor.

4. A method of determining a radiation dose parameter according to claim 1, wherein said sample is a dosimeter.

5. A method of determining a radiation dose parameter according to claim 4, wherein said sample is selected from a group consisting of a single crystal $Al_2O_3$ dosimeter and a dosimeter comprised of alkali halides containing $Eu^{2+}$ ions.

6. A method of determining a radiation parameter via OSL according to claim 1, wherein said light containing at least one predetermined light frequency therein is sourced from a Nd:YAG laser.

7. A method according to claim 1, wherein said radiation dose parameter is selected from a group consisting of a radiation cumulative dose, a radiation dose rate, an instantaneous radiation dose rate, an amount of radiation energy deposited in said sample, and a rate of energy deposition in said sample.

8. A method according to claim 1, wherein step (d) comprises the step of:
   (d1) simultaneously with said irradiation, illuminating said sample for a first period of time with light containing at least a predetermined range of light frequencies.

9. A method of determining a radiation dose parameter via OSL, comprising the steps of:
   (a) selecting a sample;
   (b) determining a luminescence correction factor for said sample;
   (c) irradiating said sample;
   (d) simultaneously with said irradiation, illuminating said sample for a first period of time with light containing at least one predetermined light frequency;
   (e) measuring a first luminescence signal from said sample;
   (f) simultaneously with said irradiation, illuminating said sample for a second period of time with said light containing said at least one predetermined light frequency;
   (g) measuring a second luminescence signal from said sample;
   (h) estimating said radiation dose parameter using at least said luminescence correction factor, said first luminescence signal and said second luminescence signal.

10. A method of determining a radiation dose parameter via OSL according to claim 9, wherein said radiation dose parameter is selected from a group consisting of a radiation cumulative dose, a radiation dose rate, an instantaneous radiation dose rate, an amount of radiation energy deposited in said sample, and a rate of energy deposition in said sample.

11. A method of determining a radiation dose parameter via OSL according to claim 9, wherein said sample is a dosimeter.

12. A method of determining a radiation dose parameter via OSL according to claim 11, wherein said dosimeter is selected from a group consisting of a single crystal $Al_2O_3$ dosimeter and a dosimeter comprised of alkali halides containing $Eu^{2+}$ ions.

13. A method of determining a radiation parameter via OSL according to claim 9, wherein said light containing at least one predetermined light frequency therein is sourced from a Nd:YAG laser.

14. A method of determining a radiation dose parameter via OSL according to claim 9, wherein step (e) comprises the step of:
   (e1) measuring a luminescence signal from said sample during said first period of time while said sample is illuminated, and, step (g) comprises the step of:
- (g1) measuring a luminescence signal from said sample during said second period of time while said sample is illuminated.

15. A method of determining a radiation dose parameter via OSL according to claim 9, wherein step (b) comprises the step of:
- (b1) determining a luminescence correction factor for said sample, wherein a functional form of said luminescence correction factor includes at least two constant coefficients and wherein said functional form of said luminescence correction factor is selected from a group consisting of a linear equation, a polynomial equation, an exponential equation, and, a trigonometric equation.

16. A method of determining a radiation dose parameter via OSL according to claim 9, wherein step (b) comprises the step of:
- (b1) determining a luminescence correction factor for said sample, wherein said luminescence correction factor is suitable for estimating a future OSL signal from a currently measured OSL signal assuming that said sample is not further irradiated after said current OSL signal is obtained.

17. A method of determining a radiation dose parameter via OSL according to claim 9, wherein step (g) comprises the step of:
- (g1) using at least said first measured illumination signal and said luminescence correction factor to determine a predicted value of said second measured luminescence signal,
- (g2) determining a difference between a said predicted value and said second measured luminescence signal, and,
- (g2) estimating said radiation dose parameter using at least said difference.

18. A method according to claim 9, wherein said light containing at least a one predetermined light frequency comprises light containing at least a predetermined range of light frequencies.

* * * * *